UNITED STATES PATENT OFFICE.

JACOB NUESSLEY, OF GOWANDA, NEW YORK.

IMPROVEMENT IN COMPOSITIONS FOR TANNING LEATHER.

Specification forming part of Letters Patent No. 27,648, dated March 27, 1860.

*To all whom it may concern:*

Be it known that I, JACOB NUESSLEY, of Gowanda, in the county of Cattaraugus and State of New York, have invented a new and Improved Composition for Tanning; and I do hereby declare that the following is a full, clear, and exact description of the same.

My composition is intended as a substitute for the usual tanning-liquid; and it consists of pyroligneous or wood-acid and wood-tar mixed with water and a small quantity of muriatic acid, and with alum and catechu, (japonica,) or some other substance which facilitates the tanning process, such as common bark-liquor.

The proportion in which I mix the above-named ingredients is about as follows: wood-acid and wood-tar mixed together in about the proportion in which they are obtained from the dry distillation of wood, after having been separated from the other substances produced by subjecting the wood to this process, one gallon; water, three gallons; muriatic acid, four ounces; catechu, (japonica,) one and three-fifths pounds; alum, two-fifths of a pound. The wood-acid and wood-tar are products obtained by subjecting wood to the dry distillation. One gallon of these products I mix thoroughly with three gallons of water, and in order to cause the tar to combine with the rest one ounce of muriatic acid is added to each gallon of the liquid, or four ounces to the mixture of one gallon of tar and wood-acid with three gallons of water. After these ingredients have thus been well mixed by stirring, I add about forty pounds of catechu (japonica) and ten pounds of alum to each one hundred gallons of the liquid, or one and three-fifths pound of catechu and two-fifths of a pound of alum to the mixture of one gallon tar and acid and three gallons of water; and in order to dissolve these last-named ingredients more readily and cause them to combine with the liquid I heat the whole over a slow fire or by steam. After all these ingredients have thus been mixed together, and when perfectly cooled off, the skins or hides are put into the liquid, and a calf-skin is readily tanned in from three to four days, a kip in nine to ten days, and heavier skins in three to four weeks, and the leather obtained by this process is fully as good as that obtained by the usual tanning process, and my tanning-liquid can be prepared at much less expense. The barks generally used for tanning become scarcer and dearer every year, still there are quantities of wood the bark of which cannot be used for tanning, but which, when subjected to the dry distillation gives out a large quantity of wood acid and tar. These two substances—viz., wood acid and tar—are the principal parts of my invention; and if mixed with common bark-liquor, or with other tanning substances, they will facilitate the tanning process; and if mixed with alum according to the above-named proportion, and without the catechu my composition can be used for tanning fur, as it preserves the natural color of the hair, and turns the flesh-side of the skin white.

I do not confine myself to the exact proportion and composition above described, but wish to remark that the tanning-liquid may be made stronger or weaker; if stronger, the skins will tan quicker, but will not be so plump and heavy; if made weaker, it will be the contrary. Furthermore, I wish to be understood that the above-mentioned products, wood-tar and wood-acid, may be combined with almost all other tanning-acids.

Having thus fully described my invention, what I claim as new, and desire to secure by Letters Patent, is—

The employment for the purpose of tanning of a composition consisting of the ingredients herein specified, and mixed together in about the proportion described.

JACOB NUESSLEY.

Witnesses:
ALBERT GAENPLEN,
JOHN P. ROLLER.